US010753066B2

(12) United States Patent
Ono

(10) Patent No.: US 10,753,066 B2
(45) Date of Patent: Aug. 25, 2020

(54) METHOD OF CONTROLLING MOTOR GRADER AND MOTOR GRADER

(71) Applicant: KOMATSU LTD., Minato-ku, Tokyo (JP)

(72) Inventor: Yutaka Ono, Tokyo (JP)

(73) Assignee: KOMATSU LTD., Tokyo (JP)

( * ) Notice: Subject to any disclaimer, the term of this patent is extended or adjusted under 35 U.S.C. 154(b) by 50 days.

(21) Appl. No.: 16/082,593

(22) PCT Filed: Mar. 16, 2017

(86) PCT No.: PCT/JP2017/010581
§ 371 (c)(1),
(2) Date: Sep. 6, 2018

(87) PCT Pub. No.: WO2017/164053
PCT Pub. Date: Sep. 28, 2017

(65) Prior Publication Data
US 2019/0093313 A1   Mar. 28, 2019

(30) Foreign Application Priority Data

Mar. 23, 2016   (JP) ................. 2016-058839

(51) Int. Cl.
*E02F 3/84*   (2006.01)
*G01C 7/04*   (2006.01)
*E02F 3/76*   (2006.01)
*E02F 9/26*   (2006.01)
*E02F 9/20*   (2006.01)

(52) U.S. Cl.
CPC ............ *E02F 3/844* (2013.01); *E02F 3/7654* (2013.01); *E02F 9/262* (2013.01); *G01C 7/04* (2013.01); *E02F 3/847* (2013.01); *E02F 9/2037* (2013.01)

(58) Field of Classification Search
CPC ......... E02F 3/844; E02F 3/7654; E02F 3/847; E02F 9/262; E02F 9/2037; G01C 7/04
See application file for complete search history.

(56) References Cited

U.S. PATENT DOCUMENTS

| 3,426,146 | A | * | 2/1969 | Seaman | .................. | E02F 3/842 |
| | | | | | | 348/118 |
| 3,494,426 | A | * | 2/1970 | Studebaker | ............. | E02F 3/847 |
| | | | | | | 172/4.5 |
| 3,588,249 | A | * | 6/1971 | Studebaker | .......... | G01C 15/004 |
| | | | | | | 356/4.08 |
| 3,786,871 | A | * | 1/1974 | Long | ....................... | E02F 3/845 |
| | | | | | | 172/4.5 |

(Continued)

FOREIGN PATENT DOCUMENTS

| CN | 101117809 A | 2/2008 |
| CN | 101230584 A | 7/2008 |

(Continued)

*Primary Examiner* — Abigail A Risic
(74) *Attorney, Agent, or Firm* — Faegre Drinker Biddle & Reath LLP

(57) ABSTRACT

A method of controlling a motor grader including a blade provided between a front wheel and a rear wheel which are attached to a vehicular body and a height adjustment mechanism which adjusts a height of the blade includes obtaining current topography in front of the motor grader and adjusting a height of the blade with respect to the front wheel based on the current topography.

16 Claims, 5 Drawing Sheets

(56) References Cited

U.S. PATENT DOCUMENTS

| | | | | |
|---|---|---|---|---|
| 3,887,012 A * | 6/1975 | Scholl | ............... | E02F 3/847 |
| | | | | 172/4.5 |
| 3,957,121 A | 5/1976 | Takeda | | |
| 4,053,018 A | 10/1977 | Takeda | | |
| 4,162,708 A * | 7/1979 | Johnson | ............ | E02F 3/765 |
| | | | | 172/4.5 |
| 4,895,440 A * | 1/1990 | Cain | ............... | G01C 15/002 |
| | | | | 172/4.5 |
| 5,375,663 A * | 12/1994 | Teach | ............... | E02F 3/847 |
| | | | | 172/4.5 |
| 6,269,885 B1 | 8/2001 | Barber et al. | | |
| 6,966,387 B2 | 11/2005 | Marriott, Jr. et al. | | |
| 9,970,180 B2 * | 5/2018 | Enix | ............... | E02F 9/2045 |
| 10,066,367 B1 * | 9/2018 | Wang | ............... | E02F 9/262 |
| 10,287,745 B1 * | 5/2019 | Keigley | ............ | A01B 63/008 |
| 2006/0042804 A1 | 3/2006 | Pecchio | | |
| 2008/0127530 A1 | 6/2008 | Kelly | | |
| 2009/0056961 A1 | 3/2009 | Gharsalli et al. | | |
| 2012/0236142 A1 * | 9/2012 | Enix | ............... | E02F 9/2045 |
| | | | | 348/118 |
| 2016/0153166 A1 * | 6/2016 | Gentle | ............... | E02F 3/844 |
| | | | | 172/781 |

FOREIGN PATENT DOCUMENTS

| | | | |
|---|---|---|---|
| JP | S48-34921 | B1 | 10/1973 |
| JP | S50-8302 | A | 1/1975 |
| JP | 2010-43446 | A | 2/2010 |
| JP | 5284721 | B2 | 9/2013 |

* cited by examiner (A)

(B)

(C)

(D)

(E)

METHOD OF CONTROLLING MOTOR GRADER AND MOTOR GRADER

TECHNICAL FIELD

The present disclosure relates to a method of controlling a motor grader and a motor grader.

BACKGROUND ART

A motor grader has conventionally been known as a work vehicle.

For example, US Patent Application Publication No. 2008/0127530 (PTD 1) discloses a method and an apparatus for controlling a blade based on a load applied to a motor grader. Specifically, a scheme for adjusting a height of the blade when a load applied to the blade is high is shown.

US Patent Application Publication No. 2009/0056961 (PTD 2) discloses a scheme for automatically adjusting the orientation and position of the blade based on a signal from a ground inclination sensor configured to sense an inclination of a surface of the ground.

CITATION LIST

Patent Document

PTD 1: US Patent Application Publication No. 2008/0127530
PTD 2: US Patent Application Publication No. 2009/0056961

SUMMARY OF INVENTION

Technical Problem

In general, in a motor grader, a blade is arranged between a front end and a rear end of a vehicular body frame. A front wheel is arranged in front of the blade. When the motor grader travels forward, the front wheel moves past the ground before the blade grades the ground. When the front wheel moves past the ground with projections and recesses, a position of the blade is varied in an upward/downward direction in correspondence with the projections and recesses in the ground. Specifically, when the front wheel moves past a projection, a position of the blade moves upward and the blade moves away from the ground, which results in insufficient land-grading works. When the front wheel moves past a recess, a position of the blade moves downward and the blade cuts into the ground. Consequently, the ground after the blade has moved past does not match with design topography.

The present disclosure was made in view of the problems above, and an object thereof is to provide a motor grader capable of improving accuracy in execution of land-grading works and a method of controlling a motor grader.

Solution to Problem

A method of controlling a motor grader according to one aspect, the motor grader including a blade provided between a front wheel and a rear wheel which are attached to a vehicular body and a height adjustment mechanism which adjusts a height of the blade, includes obtaining current topography in front of the motor grader and adjusting a height of the blade with respect to the front wheel based on the current topography.

A motor grader according to one aspect includes a vehicular body, a front wheel and a rear wheel which are attached to the vehicular body, a blade provided between the front wheel and the rear wheel, a height adjustment mechanism which adjusts a height of the blade with respect to the front wheel, an obtaining unit which obtains current topography in front of the motor grader, and a control unit which instructs the height adjustment mechanism to adjust a height of the blade with respect to the front wheel based on the current topography.

Advantageous Effects of Invention

According to a method of controlling a motor grader and a motor grader based on one embodiment, accuracy in execution of land-grading works can be improved.

DESCRIPTION OF EMBODIMENTS

Figure 1:
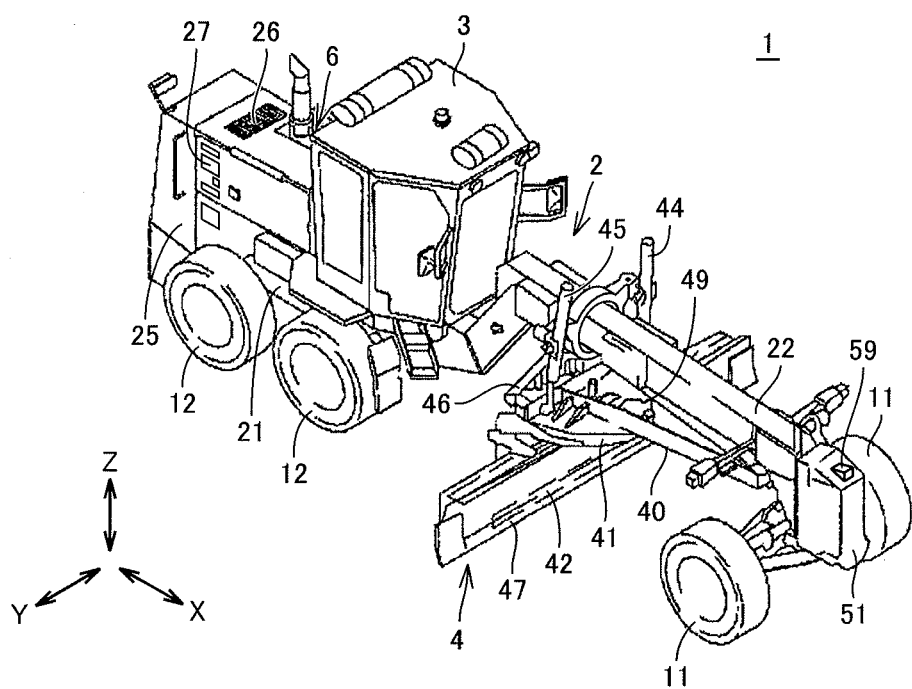
FIG. 1 is a perspective view schematically showing a construction of a motor grader 1 based on an embodiment.

A motor grader according to an embodiment will be described below. The same elements have the same reference characters allotted in the description below and their labels and functions are also the same. Therefore, detailed description thereof will not be repeated.

<A. Appearance>

FIG. 1 is a perspective view schematically showing a construction of a motor grader 1 based on an embodiment.

Figure 2:
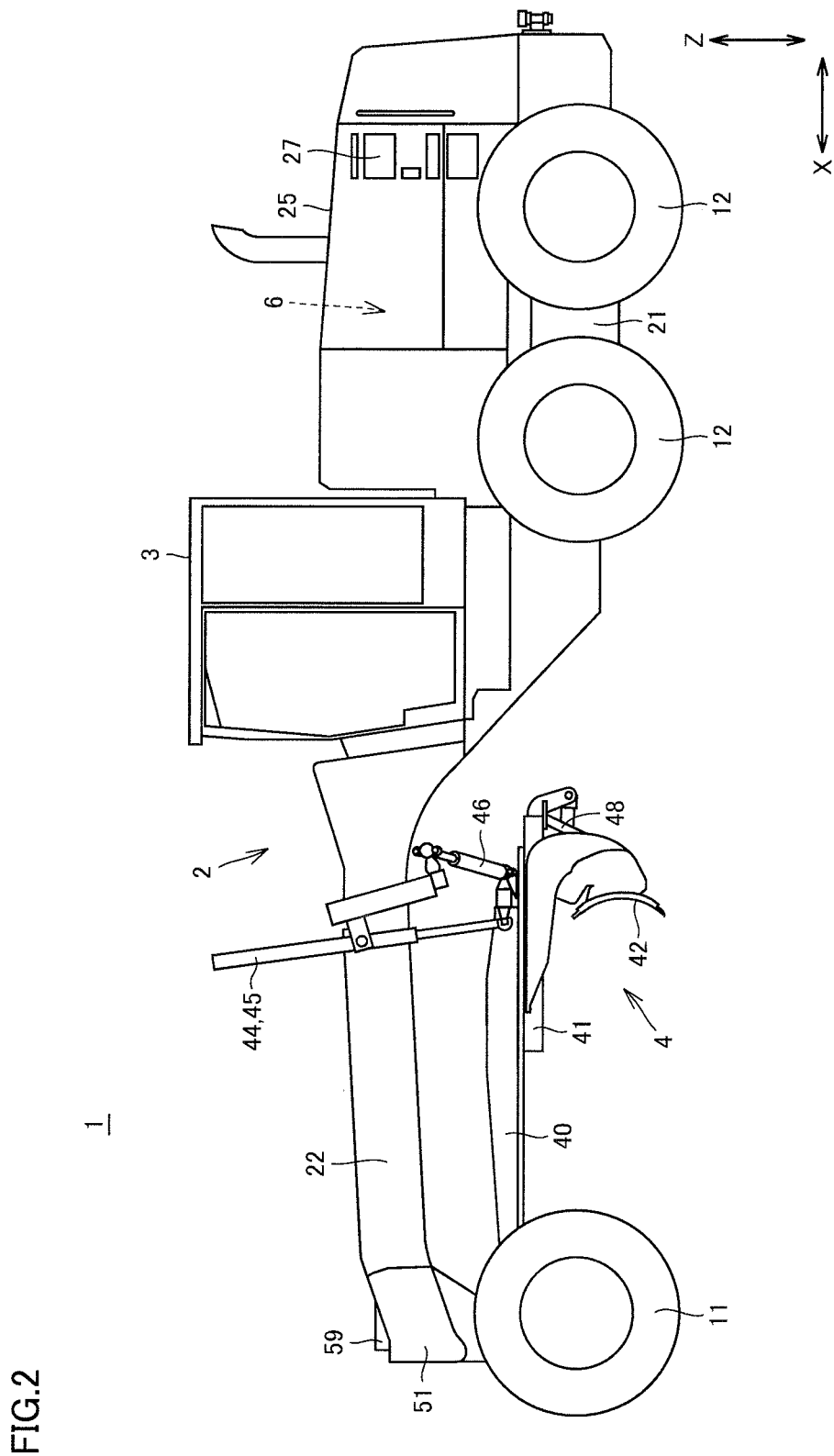
FIG. 2 is a side view schematically showing the construction of motor grader 1 based on the embodiment.

FIG. 2 is a side view schematically showing the construction of motor grader 1 based on the embodiment.

As shown in FIGS. 1 and 2, motor grader 1 in the present embodiment mainly includes running wheels 11 and 12, a vehicular body frame 2, a cab 3, and a work implement 4. Motor grader 1 includes components such as an engine arranged in an engine compartment 6. Work implement 4 includes a blade 42. Motor grader 1 can do such works as land-grading works, snow removal works, light cutting, and mixing of materials with blade 42.

Running wheels 11 and 12 include a front wheel 11 and a rear wheel 12. Though FIGS. 1 and 2 show running wheels six in total which consist of two front wheels 11 one on each side and four rear wheels 12 two on each side, the number of front wheels 11 and rear wheels 12 and arrangement thereof are not limited thereto.

In the description of the drawings below, a direction in which motor grader 1 travels in straight lines is referred to as a fore/aft direction of motor grader 1. In the fore/aft direction of motor grader 1, a side where front wheel 11 is arranged with respect to work implement 4 is defined as the fore direction. In the fore/aft direction of motor grader 1, a side where rear wheel 12 is arranged with respect to work implement 4 is defined as the aft direction. A lateral direction of motor grader 1 is a direction orthogonal to the fore/aft direction in a plan view. A right side and a left side in the lateral direction in facing front are defined as a right direction and a left direction, respectively. An upward/downward direction of motor grader 1 is a direction orthogonal to the plane defined by the fore/aft direction and the lateral direction. A side in the upward/downward direction where the ground is located is defined as a lower side and a side where the sky is located is defined as an upper side.

The fore/aft direction refers to a fore/aft direction of an operator who sits at an operator's seat in cab 3. The lateral direction refers to a lateral direction of the operator who sits at the operator's seat. The lateral direction refers to a direction of a vehicle width of motor grader 1. The upward/downward direction refers to an upward/downward direction of the operator who sits at the operator's seat. A direction in which the operator sitting at the operator's seat faces is defined as the fore direction and a direction behind the operator sitting at the operator's seat is defined as the aft direction. A right side and a left side at the time when the operator sitting at the operator's seat faces front are defined as the right direction and the left direction, respectively. A foot side of the operator who sits at the operator's seat is defined as a lower side, and a head side is defined as an upper side.

Vehicular body frame 2 includes a rear frame 21, a front frame 22, and an exterior cover 25. Rear frame 21 supports exterior cover 25 and components such as the engine arranged in engine compartment 6. Exterior cover 25 covers engine compartment 6. Exterior cover 25 is provided with an upper opening 26, a lateral opening 27, and a rear opening. Upper opening 26, lateral opening 27, and the rear opening are provided to pass through exterior cover 25 in a direction of thickness.

Rear frame 21 supports exterior cover 25 and components such as the engine arranged in engine compartment 6. Exterior cover 25 covers engine compartment 6. For example, each of four rear wheels 12 is attached to rear frame 21 as being rotatably driven by driving force from the engine.

Front frame 22 is attached in front of rear frame 21. Front frame 22 is pivotably coupled to rear frame 21. Front frame 22 extends in the fore/aft direction. Front frame 22 includes a base end portion coupled to rear frame 21 and a tip end portion opposite to the base end portion. Front frame 22 includes a front end. The front end is included in the tip end portion of front frame 22. For example, two front wheels 11 are rotatably attached to the tip end portion of front frame 22.

A counter weight 51 is attached to the front end of front frame 22 (or a front end of vehicular body frame 2). Counter weight 51 represents one type of attachments to be attached to front frame 22. Counter weight 51 is attached to front frame 22 in order to increase a downward load to be applied to front wheel 11 to allow steering and to increase a pressing load on blade 42. An image pick-up apparatus 59 for picking up an image of current topography in front of motor grader 1 is attached to counter weight 51.

A position of attachment of image pick-up apparatus 59 is not limited to the position above, and it is not particularly limited so long as an image of current topography in front of motor grader 1 can be picked up. For example, the image pick-up apparatus may be provided on an upper surface of front frame 22. Typically, a stereo camera is adopted as image pick-up apparatus 59.

Cab 3 is carried on front frame 22. In cab 3, an operation portion (not shown) such as a steering wheel, a gear shift lever, a lever for controlling work implement 4, a brake, an accelerator pedal, and an inching pedal is provided. Cab 3 may be carried on rear frame 21.

Work implement 4 mainly includes a draw bar 40, a swing circle 41, blade 42, a hydraulic motor 49, and various hydraulic cylinders 44 to 48.

Draw bar 40 has a front end portion swingably attached to the tip end portion of front frame 22. Draw bar 40 has a rear end portion supported on front frame 22 by a pair of lift cylinders 44 and 45. As a result of extending and retracting of the pair of lift cylinders 44 and 45, the rear end portion of draw bar 40 can move up and down with respect to front frame 22. Therefore, as lift cylinders 44 and 45 both retract, a height of blade 42 with respect to front frame 22 and front wheel 11 is adjusted in the upward direction. As lift cylinders 44 and 45 both extend, a height of blade 42 with respect to front frame 22 and front wheel 11 is adjusted in the downward direction.

Draw bar 40 is vertically swingable with an axis along a direction of travel of the vehicle being defined as the center, as a result of extending and retracting of lift cylinders 44 and 45.

A draw bar shift cylinder 46 is attached to front frame 22 and a side end portion of draw bar 40. As a result of extending and retracting of draw bar shift cylinder 46, draw bar 40 is movable laterally with respect to front frame 22.

Swing circle 41 is revolvably (rotatably) attached to the rear end portion of draw bar 40. Swing circle 41 can be driven by hydraulic motor 49 as being revolvable clockwise or counterclockwise with respect to draw bar 40 when viewed from above the vehicle. As swing circle 41 is driven to revolve, a blade angle of blade 42 is adjusted.

Blade 42 is arranged between front wheel 11 and rear wheel 12. Blade 42 is arranged between the front end of vehicular body frame 2 (or the front end of front frame 22) and a rear end of vehicular body frame 2. Blade 42 is supported on swing circle 41. Blade 42 is supported on front frame 22 with swing circle 41 and draw bar 40 being interposed.

Blade 42 is supported as being movable in the lateral direction with respect to swing circle 41. Specifically, a blade shift cylinder 47 is attached to swing circle 41 and blade 42 and arranged along a longitudinal direction of blade 42. With blade shift cylinder 47, blade 42 is movable in the lateral direction with respect to swing circle 41. Blade 42 is movable in a direction intersecting with a longitudinal direction of front frame 22.

Blade 42 is supported as being swingable around an axis extending in the longitudinal direction of blade 42 with respect to swing circle 41. Specifically, a tilt cylinder 48 is attached to swing circle 41 and blade 42. As a result of extending and retracting of tilt cylinder 48, blade 42 swings around the axis extending in the longitudinal direction of blade 42 with respect to swing circle 41, so that an angle of inclination of blade 42 with respect to the direction of travel of the vehicle can be changed.

As set forth above, blade 42 is constructed to be able to move up and down with respect to the vehicle, swing around the axis along the direction of travel of the vehicle, change an angle of inclination with respect to the fore/aft direction, move in the lateral direction, and swing around the axis extending in the longitudinal direction of blade 42, with draw bar 40 and swing circle 41 being interposed.

<B. System Configuration>

Figure 3:
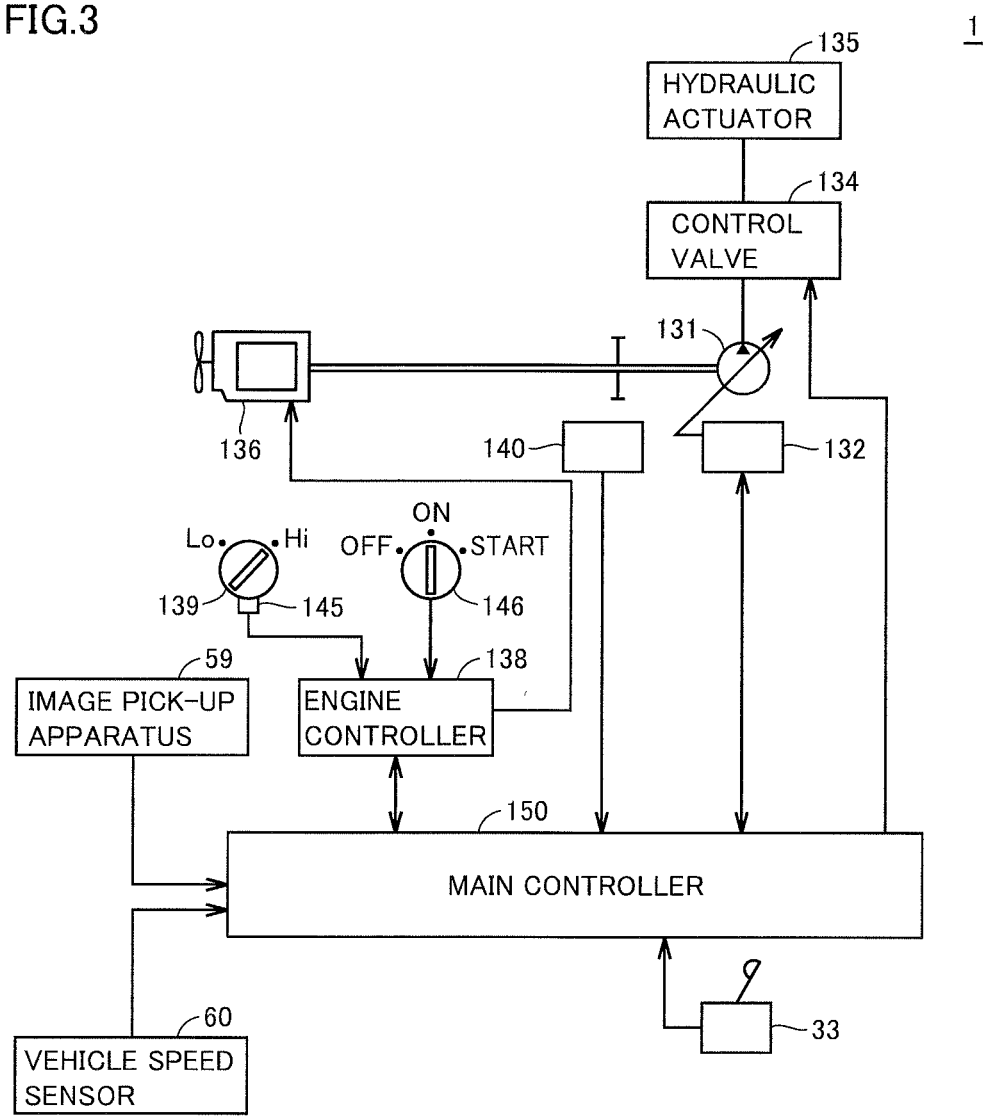
FIG. 3 is a block diagram showing a configuration of a control system included in motor grader 1 based on the embodiment.

FIG. 3 is a block diagram showing a configuration of a control system included in motor grader 1 based on the embodiment.

As shown in FIG. 3, the control system of motor grader 1 includes, by way of example, a right control lever 33, a hydraulic pump 131, a control valve 134, a hydraulic actuator 135, an engine 136, an engine controller 138, a throttle dial 139, a rotation sensor 140, a potentiometer 145, a starter switch 146, a main controller 150, image pick-up apparatus 59, and a vehicle speed sensor 60.

Hydraulic pump 131 delivers hydraulic oil used for driving work implement 4 and the like.

Hydraulic actuator 135 is connected to hydraulic pump 131 with control valve 134 being interposed. Hydraulic actuator 135 includes lift cylinders 44 and 45.

Main controller 150 outputs a command in conformity with an output electric signal in accordance with an amount of operation and a direction of operation of right control lever 33 to control valve 134.

A swash plate drive apparatus 132 is driven based on an instruction from main controller 150 and changes an angle of inclination of a swash plate of hydraulic pump 131. An amount of supply of hydraulic oil from hydraulic pump 131 to control valve 134 is accordingly adjusted.

Control valve 134 is implemented by a proportional solenoid valve and controls hydraulic actuator 135.

Specifically, supply of hydraulic oil is switched in accordance with a command from main controller 150. For example, control valve 134 switches supply of hydraulic oil such that lift cylinders 44 and 45 extend or retract in accordance with the command from main controller 150. Control valve 134 adjusts an amount of delivery of hydraulic oil to be supplied from hydraulic pump 131 to hydraulic actuator 135 in accordance with the command from main controller 150.

Engine 136 has a driveshaft connected to hydraulic pump 131 and hydraulic pump 131 is driven in coordination with the driveshaft.

Engine controller 138 controls an operation of engine 136 in accordance with an instruction from main controller 150. Engine 136 is implemented by a diesel engine by way of example. The number of rotations of engine 136 is set through throttle dial 139 or the like, and an actual number of rotations of the engine is detected by rotation sensor 140. Rotation sensor 140 is connected to main controller 150.

Potentiometer 145 is provided in throttle dial 139. Potentiometer 145 detects a set value (an amount of operation) of throttle dial 139. The set value of throttle dial 139 is transmitted to main controller 150. Potentiometer 145 outputs a command value for the number of rotations of engine 136 to engine controller 138. A target number of rotations of engine 136 is adjusted in accordance with the command value.

Engine controller 138 adjusts the number of rotations of engine 136 by controlling an amount of fuel injection by a fuel injection apparatus in accordance with an instruction from main controller 150.

Starter switch 146 is connected to engine controller 138. When an operator operates starter switch 146 (sets start), a start signal is output to engine controller 138 so that engine 136 starts.

Main controller 150 is a controller which controls the entire motor grader 1 and implemented by a central processing unit (CPU), a non-volatile memory, a timer, and the like.

Though a configuration in which main controller 150 and engine controller 138 are separate from each another is described in the present example, they can also be implemented as one common controller.

Image pick-up apparatus 59 is connected to main controller 150. Image pick-up apparatus 59 transmits image data of current topography in front of motor grader 1 obtained as a result of image pick-up to main controller 150 in real time. Main controller 150 analyzes the received image data and determines a condition of the current topography.

Image pick-up apparatus 59 picks up an image of current topography in front of motor grader 1. Specifically, image pick-up apparatus 59 picks up an image of current topography within a prescribed range in front of motor grader 1. For example, image pick-up apparatus 59 picks up an image of current topography within a range distant from a tip end portion of motor grader 1 by a prescribed distance (for example, from 1 m to 10 m). Image pick-up apparatus 59 sends image data obtained as a result of image pick-up to main controller 150.

Vehicle speed sensor 60 is connected to main controller 150. Vehicle speed sensor 60 measures a speed of motor grader 1.

<C. Control of Height of Blade>

Figure 4:
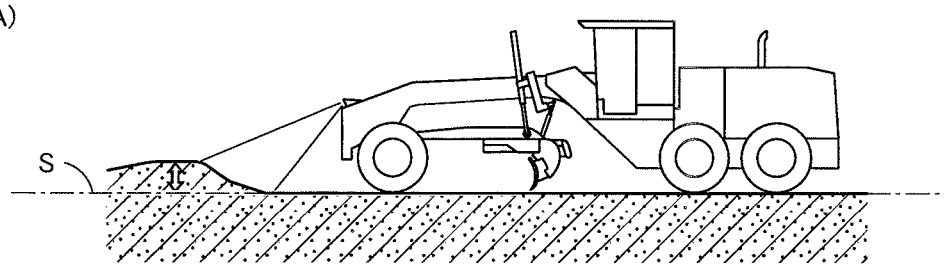
FIG. 4 is a diagram illustrating a scheme for controlling a height of a blade in accordance with a condition of current topography based on the embodiment.
Figure 4:
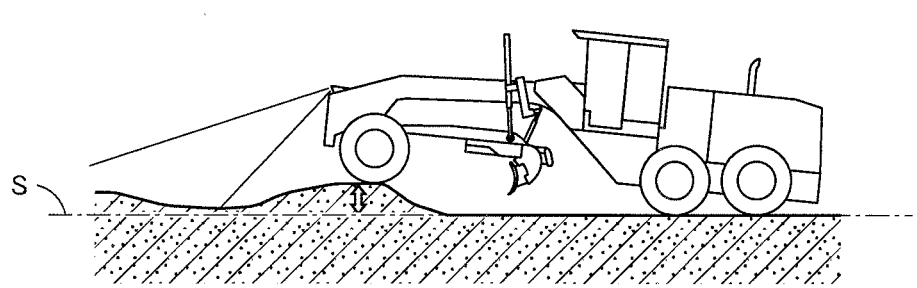
Figure 4:
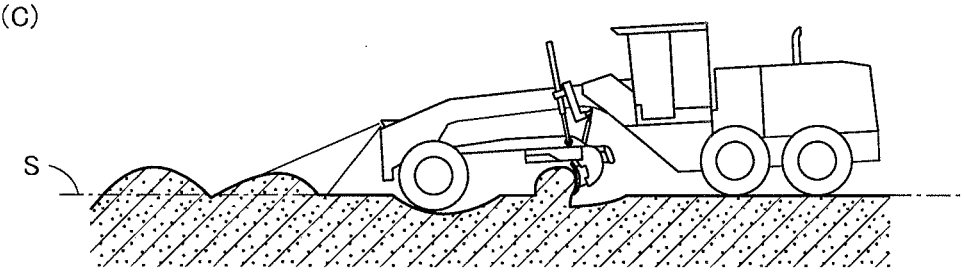
Figure 4:
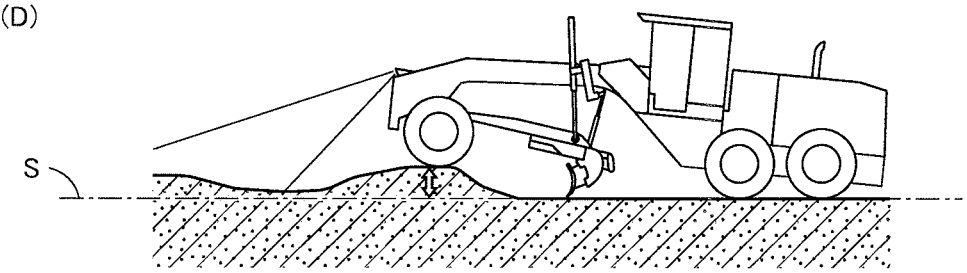
Figure 4:
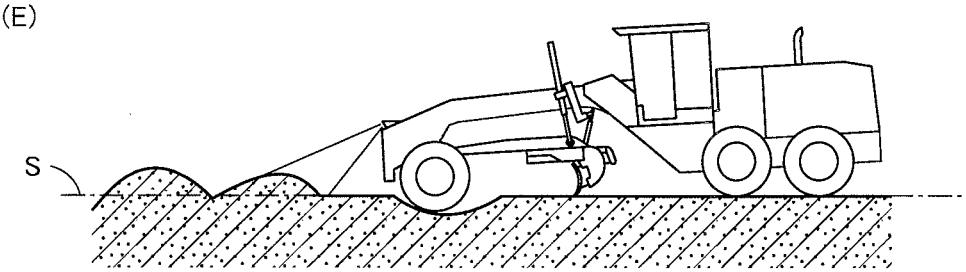

FIG. 4 is a diagram illustrating a scheme for controlling a height of the blade in accordance with a condition of current topography based on the embodiment. A line S in FIG. 4 shows target topography (which is also referred to as design topography or a target plane).

Referring to FIG. 4 (A), motor grader 1 obtains image data of current topography in front of motor grader 1 with image pick-up apparatus 59 attached in front.

Referring to FIG. 4 (B), a state in movement of front wheel 11 of motor grader 1 past a projection representing current topography is shown.

As shown in the figure, when front wheel 11 moves past a projection representing current topography, vehicular body frame 2 is lifted by the projection and hence a height of blade 42 with respect to the current topography and the target topography is varied.

Since the height of blade 42 with respect to the current topography and the target topography is varied in a direction away due to the projection, soil around the ground surface cannot be graded and highly accurate land-grading works may not be performed.

Referring to FIG. 4 (C), a state in movement of front wheel 11 of motor grader 1 past a recess representing current topography is shown.

As shown in the figure, when front wheel 11 moves past a recess, vehicular body frame 2 sinks due to the recess and hence the height of blade 42 with respect to the current topography and the target topography is varied.

Since the height of blade 42 with respect to the current topography and the target topography moves in a direction of cutting into the current topography or the target topography due to the recess, soil may be intruded, the target topography may be destroyed, and highly accurate land-grading works may not be performed.

Referring to FIG. 4 (D), when the obtained current topography in front includes a projection in the present embodiment, a height of blade 42 with respect to vehicular body frame 2 and front wheel 11 is adjusted.

Specifically, when front wheel 11 moves past the projection representing the current topography, a height of blade 42 with respect to vehicular body frame 2 and front wheel 11 is set to be lower than the current height. Motor grader 1 can thus more uniformly grade soil of the projection than in an example in which a height of blade 42 is not adjusted.

Since motor grader 1 can do land-grading works in conformity with the current topography with this scheme, accuracy in execution can be improved.

Motor grader 1 may determine a height of a projection and adjust a height of blade 42 in accordance with the determined height. Thus, in moving past a projection as well, variation in height of blade 42 with respect to the current topography and the target topography can be suppressed and highly accurate land-grading works in conformity with the current topography can be done.

Referring to FIG. 4 (E), when a recess is included in the obtained current topography in front in the present embodiment, a height of blade 42 with respect to vehicular body frame 2 and front wheel 11 is adjusted.

Specifically, when front wheel 11 moves past the recess representing the current topography, a height of blade 42 with respect to vehicular body frame 2 and front wheel 11 is set to be higher than the current height. Thus, motor grader 1 can more uniformly grade soil in the recess than in an example in which a height of blade 42 is not adjusted.

Since motor grader 1 can do land-grading works in conformity with the current topography with this scheme, accuracy in execution can be improved.

Motor grader 1 may determine a depth of a recess and adjust a height of blade 42 in accordance with the determined depth. Thus, in moving past a recess as well, variation in height of blade 42 with respect to the current topography and the target topography can be suppressed and highly accurate land-grading works in conformity with the current topography can be done.

Since displacement of a position of blade 42 from target topography (design topography) due to projections and recesses in current topography can be suppressed, accuracy in execution can be enhanced and topography after execution can be close to the design topography. Since the number of times of travel of motor grader 1 required for land-grading works can thus be decreased, time for execution can be reduced.

<D. Control Flow>

Figure 5:
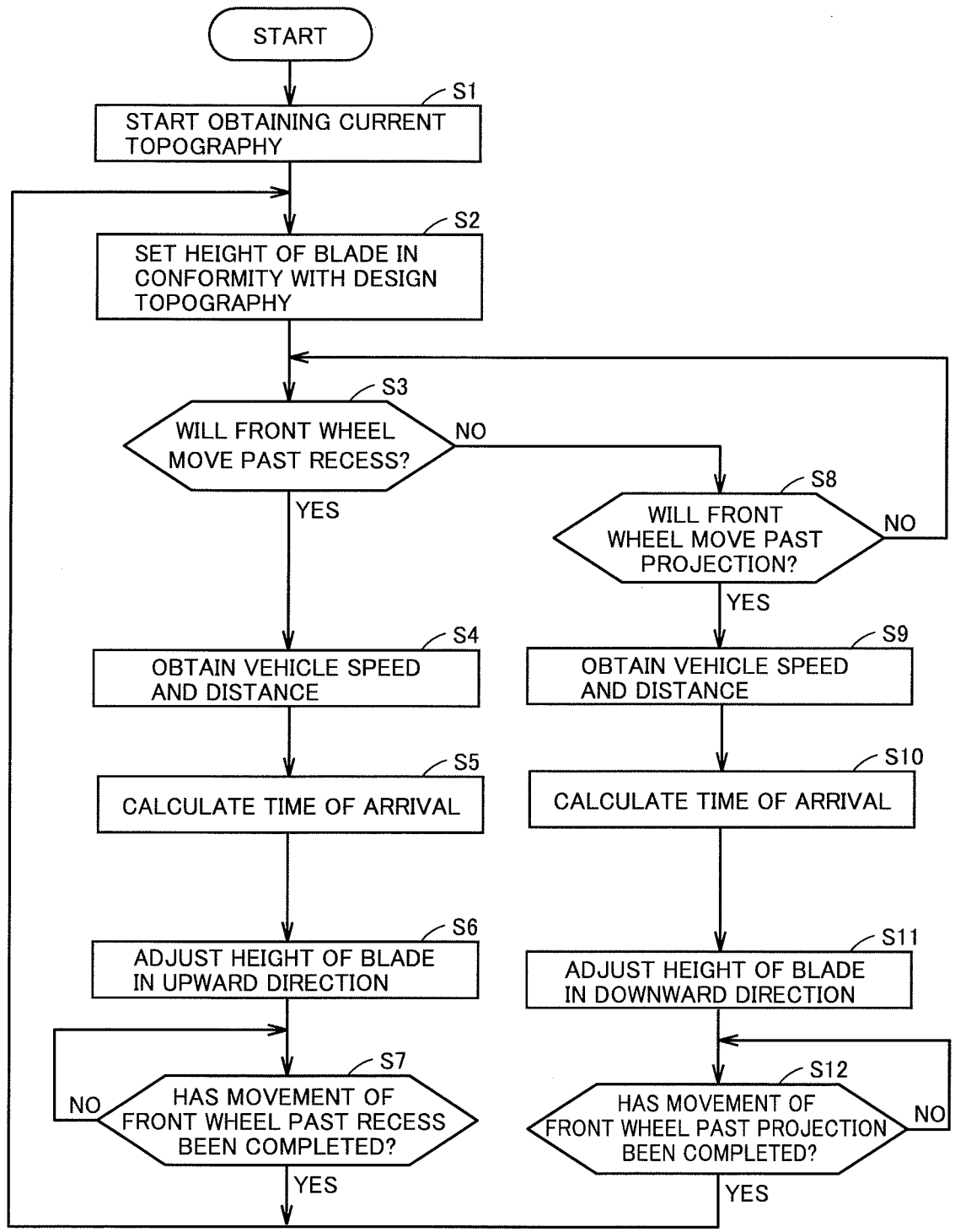
FIG. 5 is a diagram illustrating a flow for adjusting a height of the blade in motor grader 1 based on the embodiment.

FIG. 5 is a diagram illustrating a flow for adjusting a height of the blade in motor grader 1 based on the embodiment.

Referring to FIG. 5, main controller 150 starts obtaining image data of current topography picked up by image pick-up apparatus 59 (step S1). Main controller 150 performs analysis processing each time it obtains image data from image pick-up apparatus 59. Main controller 150 determines whether or not the current topography in front of motor grader 1 includes projections and recesses based on a result of analysis of the obtained image data.

The current topography includes at least small projections and recesses because land-grading is incomplete. Motor grader 1 does not have to change a height of the blade for such small projections and recesses.

Therefore, in order not to take such small projections and recesses into consideration, main controller 150 determines whether or not there are projections and recesses other than the small projections and recesses. Specifically, main controller 150 determines whether or not there are a recess and a projection equal to or larger than a prescribed reference in front, and when there are a recess and a projection as such, the main controller determines that there are projections and recesses.

Then, main controller 150 sets a height of the blade in conformity with target topography (design topography) (step S2). Specifically, main controller 150 sets a height of the blade such that the current topography is in conformity with the design topography. When a plurality of land-grading steps are required in consideration also of a load applied to the current topography by blade 42, main controller 150 can set a height of the blade by setting stepwise such target topography as being closer stepwise to design topography. Though an example in which a height of the blade is automatically calculated and set in conformity with the design topography is described in the present example, a height of the blade may be set in conformity with the design topography set by an operation instruction from an operator. Specifically, a height of the blade may be set based on a command in accordance with an amount of operation and a direction of operation of right control lever 33.

Then, main controller 150 determines whether or not front wheel 11 will move past a recess (step S3). Specifically, main controller 150 determines whether or not front wheel 11 will move past a recess based on the obtained image data.

When main controller 150 determines in step S3 that front wheel 11 will move past a recess (YES in step S3), it obtains a vehicle speed and a distance between motor grader 1 and the recess (step S4). Main controller 150 calculates a distance between motor grader L and the recess. For example, a distance from image pick-up apparatus 59 to the recess can be defined as a distance between motor grader 1 and the recess. Alternatively, a distance calculated by adding a distance between image pick-up apparatus 59 and blade 42 to a distance from image pick-up apparatus 59 to the recess may be defined as a distance between motor grader 1 and the recess. A speed measured by vehicle speed sensor 60 may be used as the vehicle speed.

Main controller 150 calculates a time at which motor grader 1 (for example, blade 42) will reach the recess based on the calculated distance and the speed of motor grader 1 (step S5).

Main controller 150 adjusts a height of the blade in the upward direction (step S6). Specifically, main controller 150 sets the height of the blade with respect to vehicular body frame 2 (or front wheel 11) to be higher than the set current height (adjusts the height in the upward direction). Main controller 150 instructs control valve 134 to retract both of lift cylinders 44 and 45.

Main controller 150 controls a speed of extending and retracting of the cylinders so as to complete adjustment of the height of blade 42 by the calculated time. According to such a configuration, a height of the blade can appropriately be set by the time point when motor grader 1 reaches the recess. Variation in height of the blade can be suppressed and accuracy in execution of land-grading works can be improved.

Main controller 150 determines whether or not movement of front wheel 11 past the recess has been completed (step S7). Specifically, main controller 150 determines whether or not front wheel 11 has moved past the recess based on the obtained image data. Main controller 150 calculates a distance until the front wheel moves past the recess, and calculates a time until the front wheel moves past the recess based on the calculated distance and the speed of motor grader 1. Then, main controller 150 determines whether or not time from start of movement of front wheel 11 past the recess until completion of movement past the recess has elapsed. When main controller 150 determines that the time from start of movement of front wheel 11 past the recess until completion of movement past the recess has elapsed, it can determine that movement past the recess has been completed.

In step S7, main controller 150 maintains the state in step S7 until movement of front wheel 11 past the recess is completed (NO in step S7), and when main controller 150 determines that movement of front wheel 11 past the recess has been completed (YES in step S7), the process returns to step S2. Specifically, main controller 150 sets a height of the blade in conformity with the design topography as described above.

When main controller 150 determines in step S3 that front wheel 11 will not move past a recess (NO in step S3), it determines whether or not front wheel 11 will move past a projection (step S8). Specifically, main controller 150 determines whether or not front wheel 11 will move past a projection based on the obtained image data.

When main controller 150 determines in step S8 that front wheel 11 will move past a projection (YES in step S8), it obtains a vehicle speed and a distance between motor grader 1 and the projection (step S9). Main controller 150 calculates a distance between motor grader 1 and the projection. For example, a distance from image pick-up apparatus 59 to the projection can be defined as a distance between motor grader 1 and the projection. Alternatively, a distance calculated by adding a distance between image pick-up apparatus 59 and blade 42 to a distance from image pick-up apparatus 59 to the projection may be defined as a distance between motor grader 1 and the projection. A speed measured by vehicle speed sensor 60 may be used as the vehicle speed.

Main controller 150 calculates a time when motor grader 1 (for example, blade 42) will reach the projection based on the calculated distance and the speed of motor grader 1 (step S10).

Main controller 150 adjusts a height of the blade in a downward direction (step S11). Specifically, main controller 150 sets the height of the blade with respect to vehicular body frame 2 to be lower than the set current height (adjusts the height in the downward direction). Main controller 150 instructs control valve 134 to extend both of lift cylinders 44 and 45.

Main controller 150 controls a speed of extending and retracting of the cylinders so as to complete adjustment of the height of blade 42 by the calculated time. According to such a configuration, the height of the blade can appropriately be set by the time point when motor grader 1 reaches the projection.

Main controller 150 determines whether or not movement of front wheel 11 past the projection has been completed (step S12). Specifically, main controller 150 determines whether or not front wheel 11 has moved past the projection based on the obtained image data. Main controller 150 calculates a distance until the front wheel moves past the projection and calculates a time until the front wheel moves past the projection based on the calculated distance and the speed of motor grader 1. Then, main controller 150 determines whether or not time from start of movement of front wheel 11 past the projection until completion of movement past the projection has elapsed. Then, when main controller 150 determines that the time from start of movement of front wheel 11 past the projection until completion of movement past the projection has elapsed, it can determine that movement past the projection has been completed.

In step S12, main controller 150 maintains the state in step S12 until movement of front wheel 11 past the projection is completed (NO in step S12), and when main controller 150 determines that movement of front wheel 11 past the projection has been completed (YES in step S12), the process returns to step S2. Specifically, main controller 150 sets a height of the blade in conformity with design topography as described above.

Through the processing, a height of the blade is adjusted in conformity with projections and recesses in the current topography. Since displacement of a position of blade 42 from the design topography due to projections and recesses in the current topography can thus be suppressed, accuracy in execution can be enhanced and topography after execution can be close to the design topography. A height of the blade with respect to target topography is varied as front wheel 11 moves past the projections and recesses in the current topography. Before front wheel 11 moves past the projections and recesses in the current topography, however, adjustment of a height of the blade is ready. Since delay in response in control of the blade can thus be suppressed, accuracy in execution is enhanced. Since the number of times of travel of motor grader 1 required for land-grading works can thus be decreased, time for execution can be reduced.

<E. Modification>

Though motor grader 1 obtains current topography with image pick-up apparatus 59 in the above example, limitation thereto is not intended. A laser apparatus may be employed instead of image pick-up apparatus 59. In this case, current topography may be obtained by scanning the current topography with laser beams emitted from the laser apparatus.

Though a configuration in which motor grader 1 itself directly obtains current topography is described above by way of example, limitation thereto is not intended. For example, motor grader 1 may obtain information on current topography from a server which can communicate. Though an example in which current topography is obtained with image pick-up apparatus 59 is described as obtainment of current topography, the image pick-up apparatus does not necessarily have to be attached to motor grader 1, and image data from image pick-up apparatus 59 provided in another apparatus may be used or image data obtained in advance may be used. I In this regard, an approach to obtain image data is not limited in any manner. In this case, current topography in front of motor grader 1 may be obtained based on information on current topography obtained in advance and positional information of motor grader 1 obtained by providing a GNSS antenna in motor grader 1. In this regard, an approach to obtain image data is not limited in any manner. Design topography obtained in advance may be used as target topography (design topography). In this case, a height of blade 42 with respect to front wheel 11 is desirably adjusted such that the height of blade 42 with respect to front wheel 11 is maintained above the target topography.

<Function and Effect>

A method of controlling a motor grader according to one aspect, the motor grader including a blade provided between a front wheel and a rear wheel which are attached to a vehicular body and a height adjustment mechanism which adjusts a height of the blade, includes obtaining current topography in front of the motor grader and adjusting a height of the blade with respect to the front wheel based on the current topography.

Since a height of the blade is thus adjusted based on current topography, accuracy in execution of land-grading works can be improved.

Preferably, obtaining a vehicle speed of the motor grader is further included. In the adjusting a height of the blade with respect to the front wheel, the height of the blade with respect to the front wheel is adjusted based on the current topography and the vehicle speed.

Since a height of the blade with respect to the vehicular body is thus adjusted based on the current topography and the vehicle speed, variation in height of the blade can be suppressed and accuracy in execution of land-grading works can be improved.

Preferably, determining whether or not the front wheel will move past a recess is further included. In the adjusting a height of the blade with respect to the front wheel, when it is determined that the front wheel will move past a recess, the height of the blade with respect to the front wheel is set to be higher than a current height.

Therefore, intrusion into soil in movement of the front wheel past the recess can be suppressed and accuracy in execution of land-grading works of the recess can be improved.

Preferably, setting target topography is further included. In the adjusting a height of the blade with respect to the front wheel, the height of the blade with respect to the front wheel is maintained above the target topography.

Therefore, by maintaining a height of the blade with respect to the front wheel above the target topography, intrusion into target topography can be suppressed and accuracy in execution of land-grading works of the target topography can be improved.

Preferably, determining whether or not the front wheel has moved past the recess is further included. In the adjusting a height of the blade with respect to the front wheel, when it is determined that the front wheel has moved past the recess, the height of the blade with respect to the front wheel is adjusted again.

Therefore, when the front wheel has moved past the recess, a height of the blade is adjusted again, so that accuracy in execution of land-grading works can be improved.

Preferably, determining whether or not the front wheel will move past a projection is further included. In the adjusting a height of the blade with respect to the front wheel, when it is determined that the front wheel will move past a projection, the height of the blade with respect to the front wheel is set to be lower than a current height.

Therefore, when the front wheel moves past the projection, insufficient land-grading works can be suppressed and accuracy in execution of land-grading works of the projection can be improved.

Preferably, determining whether or not the front wheel has moved past the projection is further included. In the adjusting a height of the blade with respect to the front wheel, when it is determined that the front wheel has moved past the projection, the height of the blade with respect to the front wheel is adjusted again.

Therefore, when the front wheel has moved past the projection, a height of the blade is adjusted again, so that accuracy in execution of land-grading works can be improved.

Preferably, in the obtaining current topography, the current topography is obtained by at least one of picking up an image of the current topography with an image pick-up apparatus and scanning the current topography with laser.

Therefore, accuracy in execution of land-grading works can be improved by accurately obtaining current topography with an image pick-up apparatus or laser.

A motor grader according to one aspect includes a vehicular body, a front wheel and a rear wheel attached to the vehicular body, a blade provided between the front wheel and the rear wheel, a height adjustment mechanism which adjusts a height of the blade with respect to the front wheel, an obtaining unit which obtains current topography in front of the motor grader, and a control unit which instructs the height adjustment mechanism to adjust a height of the blade with respect to the front wheel based on the current topography.

Since a height of the blade is adjusted based on the obtained current topography, accuracy in execution of land-grading works can be improved.

Preferably, the control unit obtains a vehicle speed of the motor grader and instructs the height adjustment mechanism to adjust the height of the blade with respect to the front wheel based on the current topography and the vehicle speed.

Since a height of the blade with respect to the vehicular body is thus adjusted based on the current topography and the vehicle speed, variation in height of the blade can be suppressed and accuracy in execution of land-grading works can be improved.

Preferably, the control unit determines whether or not the front wheel will move past a recess, and when the control unit determines that the front wheel will move past a recess, the control unit instructs the height adjustment mechanism to set the height of the blade with respect to the front wheel to be higher than a current height.

Therefore, intrusion into soil in movement of the front wheel past the recess can be suppressed and accuracy in execution of land-grading works of the recess can be improved.

Preferably, the control unit determines whether or not the front wheel has moved past the recess, and when the control unit determines that the front wheel has moved past the recess, the control unit instructs the height adjustment mechanism to adjust the height of the blade with respect to the front wheel again.

Therefore, when the front wheel has moved past the recess, a height of the blade is adjusted again, so that accuracy in execution of land-grading works can be improved.

Preferably, the control unit determines whether or not the front wheel will move past a projection, and when the control unit determines that the front wheel will move past a projection, the control unit instructs the height adjustment mechanism to set the height of the blade with respect to the front wheel to be lower than a current height.

Therefore, when the front wheel moves past the projection, insufficient land-grading works can be suppressed and accuracy in execution of land-grading works of the projection can be improved.

Preferably, the control unit determines whether or not the front wheel has moved past the projection, and when the control unit determines that the front wheel has moved past the projection, the control unit instructs the height adjustment mechanism to adjust the height of the blade with respect to the front wheel again.

Therefore, when the front wheel has moved past the projection, a height of the blade is adjusted again, so that accuracy in execution of land-grading works can be improved.

Preferably, the obtaining unit obtains the current topography with at least one of an image pick-up apparatus attached to the motor grader and laser attached to the motor grader.

Therefore, accuracy in execution of land-grading works can be improved by accurately obtaining current topography with an image pick-up apparatus or laser.

Though motor grader 1 includes cab 3 in the embodiment described so far, motor grader 1 does not necessarily have to include cab 3. Motor grader 1 is not limited to such specifications that an operator is on board motor grader 1 to operate motor grader 1, but the specifications may be such that the motor grader is operated under external remote control. Since motor grader 1 does not require cab 3 for an operator to get on board in this case, motor grader 1 does not have to include cab 3.

The embodiment disclosed herein is illustrative and not restricted to the above disclosure alone. The scope of the present application is defined by the terms of the claims and is intended to include any modifications within the scope and meaning equivalent to the terms of the claims.

REFERENCE SIGNS LIST 1 motor grader; 2 vehicular body frame; 3 cab; 4 work implement; 11 front wheel; 12 rear wheel; 19 axle shaft; 21 rear frame; 22 front frame; 40 draw bar; 41 swing circle; 42 blade; 44, 45 lift cylinder; 46 draw bar shift cylinder; 47 blade shift cylinder; 48 tilt cylinder; 49 hydraulic motor; 51 anchor weight; 59 image pick-up apparatus; 118 work implement lever; 131 hydraulic pump; 132 swash plate drive apparatus; 135 hydraulic actuator; 136 engine; 138 engine controller; 139 throttle dial; and 150 main controller

The invention claimed is:

1. A method of controlling a motor grader, the motor grader including a vehicular body, a blade provided between a front wheel and a rear wheel which are attached to the vehicular body, an imaging device or a laser device arranged in front of the vehicular body for obtaining current topography data in front of the vehicular body, and a height adjustment mechanism which adjusts a height of the blade, the method comprising:
obtaining the current topography data in front of the motor grader; and
adjusting a height of the blade with respect to the front wheel based on the current topography data.

2. The method of controlling a motor grader according to claim 1, wherein
the motor grader further includes a vehicle speed sensor for measuring a vehicle speed of the motor grader, and
the step of adjusting a height of the blade with respect to the front wheel includes
a step of receiving the measured vehicle speed, and
the step of adjusting the height of the blade with respect to the front wheel is based on the current topography data and the received vehicle speed.

3. The method of controlling a motor grader according to claim 1, wherein
the step of adjusting a height of the blade with respect to the front wheel includes
a step of determining whether the front wheel will move past a recess, and
a step of setting the height of the blade to be higher than a current height when it is determined that the front wheel will move past the recess.

4. The method of controlling a motor grader according to claim 3, wherein
the step of adjusting a height of the blade with respect to the front wheel includes
a step of determining whether the front wheel has moved past the recess, and
a step of adjusting the height of the blade with respect to the front wheel again when it is determined that the front wheel has moved past the recess.

5. The method of controlling a motor grader according to claim 1, wherein
the step of adjusting a height of the blade with respect to the front wheel includes
a step of setting target topography data, and
a step of maintaining the height of the blade with respect to the front wheel above the target topography.

6. The method of controlling a motor grader according to claim 1, wherein
the step of adjusting a height of the blade with respect to the front wheel includes
a step of determining whether the front wheel will move past a projection, and
a step of setting the height of the blade with respect to the front wheel to be lower than a current height when it is determined that the front wheel will move past the projection.

7. The method of controlling a motor grader according to claim 6, wherein
the step of adjusting a height of the blade with respect to the front wheel includes
a step of determining whether the front wheel has moved past the projection, and
a step of adjusting the height of the blade with respect to the front wheel again when it is determined that the front wheel has moved past the projection.

8. A motor grader comprising:
a vehicular body;
a front wheel and a rear wheel attached to the vehicular body;
a blade provided between the front wheel and the rear wheel;
a height adjustment mechanism which adjusts a height of the blade with respect to the front wheel;
an imaging device or a laser device arranged in front of the vehicular body for obtaining current topography data in front of the vehicular body; and
a control unit which instructs the height adjustment mechanism to adjust a height of the blade with respect to the front wheel based on the obtained current topography data.

9. The motor grader according to claim 8, the motor grader further comprising a vehicle speed sensor for measuring a vehicle speed of the motor grader, wherein
the control unit receives the vehicle speed of the motor grader measured by the vehicle speed sensor and instructs the height adjustment mechanism to adjust the height of the blade with respect to the front wheel based on the current topography data and the received vehicle speed.

10. The motor grader according to claim 8, wherein
the control unit determines whether the front wheel will move past a recess, and
when the control unit determines that the front wheel will move past the recess, the control unit instructs the height adjustment mechanism to set the height of the blade with respect to the front wheel to be higher than a current height.

11. The motor grader according to claim 10, wherein
the control unit determines whether the front wheel has moved past the recess, and
when the control unit determines that the front wheel has moved past the recess, the control unit instructs the height adjustment mechanism to adjust the height of the blade with respect to the front wheel again.

12. The motor grader according to claim 8, wherein
the control unit determines whether the front wheel will move past a projection, and
when the control unit determines that the front wheel will move past the projection, the control unit instructs the height adjustment mechanism to set the height of the blade with respect to the front wheel to be lower than a current height.

13. The motor grader according to claim 12, wherein
the control unit determines whether the front wheel has moved past the projection, and
when the control unit determines that the front wheel has moved past the projection, the control unit instructs the height adjustment mechanism to adjust the height of the blade with respect to the front wheel again.

14. The motor grader according to claim 8, wherein
the control unit calculates a distance between the motor grader and a recess or a projection, and calculates a time when the motor grader reaches the recess or the projection based on the calculated distance and the vehicle speed.

15. The motor grader according to claim 8, wherein
the control unit determines whether or not there is a recess or a projection equal to or greater than a prescribed reference size in front of the front wheel of the motor grader, and determines, when the control unit determines that there is a recess or a projection equal to or greater than the prescribed reference size, that there are projections and recesses.

16. The motor grader according to claim 8, wherein
the imaging device or the laser device is provided on an upper surface of a front frame.

* * * * *